(12) United States Patent
Billich

(10) Patent No.: US 12,503,971 B2
(45) Date of Patent: Dec. 23, 2025

(54) SYSTEM FOR OPERATING A COOLING DEVICE OF A UTILITY VEHICLE

(71) Applicant: DEERE & COMPANY, Moline, IL (US)

(72) Inventor: Manuel Billich, Dischingen (DE)

(73) Assignee: Deere & Company, Moline, IL (US)

( * ) Notice: Subject to any disclaimer, the term of this patent is extended or adjusted under 35 U.S.C. 154(b) by 376 days.

(21) Appl. No.: 18/303,406

(22) Filed: Apr. 19, 2023

(65) Prior Publication Data
US 2023/0340901 A1 Oct. 26, 2023

(30) Foreign Application Priority Data

Apr. 21, 2022 (DE) .......................... 102022109600.9

(51) Int. Cl.
| | | |
|---|---|---|
| *F01P 5/04* | (2006.01) | |
| *B60H 1/00* | (2006.01) | |
| *B60K 11/06* | (2006.01) | |

(52) U.S. Cl.
CPC ............ *F01P 5/04* (2013.01); *B60H 1/00464* (2013.01); *B60K 11/06* (2013.01); *F01P 2025/08* (2013.01)

(58) Field of Classification Search
CPC .. F01P 5/04; F01P 2025/08; F01P 7/06; F01P 3/20; F01P 7/16; F01P 7/164; F01P 2005/125; F01P 7/04; B60H 1/00464; B60K 11/06; B60K 2025/022; B60K 11/02; B60Y 2200/22; B60Y 2200/41;
(Continued)

(56) References Cited

U.S. PATENT DOCUMENTS

| | | | | |
|---|---|---|---|---|
| 2,189,888 A | * | 2/1940 | Endsley | .................... F01P 7/14 |
| | | | | 165/122 |
| 2,734,493 A | * | 2/1956 | Findley | .................... F01P 7/06 |
| | | | | 236/35 |

(Continued)

FOREIGN PATENT DOCUMENTS

| | | | | | |
|---|---|---|---|---|---|
| CN | 107139713 A | * | 9/2017 | ............. | B60K 11/06 |
| CN | 116658286 A | * | 8/2023 | ................ | F01P 7/06 |
| DE | 102019003713 A1 | * | 11/2020 | ............. | F04D 17/16 |

OTHER PUBLICATIONS

DE-102019003713-A1 English Translation (Year: 2020).*
(Continued)

*Primary Examiner* — Michael T. Walsh
(74) *Attorney, Agent, or Firm* — Taft Stettinius & Hollister LLP; Stephen F. Rost

(57) ABSTRACT

A system for operating a cooling device of a utility vehicle includes an axial fan, a temperature sensor, and a control unit. The axial fan can be rotated by a fan drive and is used to generate a cooling air stream for impingement on a vehicle assembly that is to be cooled. The axial fan has a plurality of fan blades that can be pivoted in terms of an angle of incidence by deflection of an actuator. The temperature sensor determines an actual value of a temperature variable that reflects a present operating temperature of the vehicle assembly. The control unit compares the actual value of the temperature variable with a specified setpoint value to output a target value of a control variable provided for the operation of the actuator. The control variable is one of a hydraulic and a pneumatic operation pressure for deflecting the actuator.

4 Claims, 3 Drawing Sheets

(58) Field of Classification Search
CPC ........ B60Y 2400/302; B60Y 2400/306; B60Y 2400/406; F04D 27/0246; F04D 29/362; F05D 2270/303
See application file for complete search history.

(56) References Cited

U.S. PATENT DOCUMENTS

| | | | | |
|---|---|---|---|---|
| 2,826,395 | A * | 3/1958 | Petty | F04D 29/362 |
| | | | | 261/DIG. 11 |
| 6,253,716 | B1 * | 7/2001 | Palmer | F04D 27/002 |
| | | | | 123/41.12 |
| 6,729,844 | B2 * | 5/2004 | Bettencourt | F04D 29/362 |
| | | | | 416/37 |
| 7,008,184 | B2 * | 3/2006 | Bettencourt, Jr. | F04D 27/002 |
| | | | | 416/61 |
| 7,229,250 | B2 * | 6/2007 | McCallum | F04D 27/002 |
| | | | | 416/1 |
| 11,668,228 | B2 * | 6/2023 | Muttepawar | A01D 41/1274 |
| | | | | 454/139 |
| 2004/0033136 | A1 * | 2/2004 | Bettencourt | F04D 27/002 |
| | | | | 416/37 |
| 2005/0100444 | A1 | 5/2005 | McCallum et al. | |
| 2020/0318584 | A1 * | 10/2020 | Clark | F02M 35/024 |

OTHER PUBLICATIONS

CN-116658286-A English Translation (Year: 2023).*
CN-107139713-A English Translation (Year: 2017).*
European Search Report issued in application No. 23163626.7, dated Sep. 11, 2023, 6 pages.

* cited by examiner

SYSTEM FOR OPERATING A COOLING DEVICE OF A UTILITY VEHICLE

CROSS-REFERENCE TO RELATED APPLICATIONS

This application claims priority to German Patent Application No. 102022109600.9, filed Apr. 21, 2022, which is hereby incorporated by reference.

FIELD OF THE DISCLOSURE

The disclosure relates to a system for operating a cooling device of a utility vehicle.

BACKGROUND

Vehicles have cooling devices for generating a flow of cooling air, as shown for example in DE 10 2019 003 713 A1.

SUMMARY

The disclosure relates to a system for operating a cooling device of a utility vehicle, the system comprising an axial fan which can be set in rotation by a fan drive and which is used to generate a cooling air stream for impingement on a vehicle assembly that is to be cooled, the axial fan having a plurality of fan blades that can be pivoted in terms of an angle of incidence by deflection of a pressure-operable actuator, the system comprising a temperature sensor for determining an actual value of a temperature variable that reflects a present operating temperature of the vehicle assembly, and the system comprising a control unit that compares the actual value of the temperature variable with a specified setpoint value in order, in accordance with an ascertained control deviation, to output a target value of a control variable provided for the operation of the actuator.

Such a system, which is based on purely temperature-based closed-loop control of an axial fan with adjustable fan blades for the purposes of adapting cooling power, is known for example from DE 10 2019 003 713 A1. Since the operating temperature of an air-cooled vehicle assembly reacts relatively sluggishly to changes in the cooling air stream, the result is imprecise closed-loop temperature control behavior, which for example has an overshooting tendency.

To improve the closed-loop control behavior, it is therefore known to additionally provide a subordinate control loop which serves for adjusting, by closed-loop control, the angle of incidence of the fan blades, more specifically a deflection that occurs at an actuator for the purposes of adjusting the fan blades. The sensor-based detection of the deflection, the detection being required for adjusting the angle of incidence by closed-loop control, is relatively complex, because the deflection occurs on a rotating part of the axial fan, specifically on a fan hub which bears the fan blades and into which the actuator is structurally integrated.

It is therefore an object of the present disclosure to specify a system of the type mentioned in the introduction with regard to achieving precise closed-loop control behavior with simultaneously reduced technical complexity.

The object is achieved by a system for operating a cooling device of a utility vehicle, having the features of one or more of the following embodiments.

The system for operating a cooling device of a utility vehicle comprises an axial fan which can be set in rotation by a fan drive and which is used to generate a cooling air stream for impingement on a vehicle assembly that is to be cooled. Here, the axial fan has a plurality of fan blades that can be pivoted in terms of an angle of incidence by deflection of a pressure-operable actuator. The system furthermore comprises a temperature sensor for determining an actual value of a temperature variable that reflects a present operating temperature of the vehicle assembly, and a control unit that compares the actual value of the temperature variable with a specified setpoint value in order, in accordance with an ascertained control deviation, to output a target value of a control variable provided for the operation of the actuator. According to the disclosure, the control variable is a hydraulic or pneumatic operation pressure provided for deflecting the actuator.

Not only is the operation pressure detectable with relatively little technical complexity by a conventional pressure sensor at any location in a pressure control line leading to the actuator (and thus remote from moving parts of the axial fan), but the operation pressure furthermore makes it possible, in the case of a known deflection behavior and thus positioning behavior of the actuator, to unambiguously predict the angle of incidence of the fan blades that arises in a manner dependent on the input operation pressure.

This creates various possibilities for achieving precise setting of the cooling air stream that can be generated by the axial fan.

Feedback Approach

In a first functional embodiment of the system according to the disclosure, an electrically controllable pressure control valve may be provided for the pressure operation of the actuator, the control unit comparing the output target value of the control variable with a sensor-detected actual value in order, in accordance with an ascertained control deviation, to generate an electrical operation signal for activating the pressure control valve.

In the case of this approach, the system according to the disclosure therefore comprises an arrangement of cascaded control loops. Aside from an outer control loop, in which a minimization of the control deviation ascertained for the temperature variable is performed, an inner control loop is also provided, which serves for the actual adjustment of the control variable by closed-loop control by the pressure control valve. The pressure control valve is thus a constituent part of the inner control loop, and possible tolerances with regard to the operation behavior of the pressure control valve are jointly corrected in the context of the inner control loop.

The detection of the actual value of the control variable, that is to say of the hydraulic or pneumatic operation pressure prevailing at the actuator, is performed here by a pressure sensor that is connected to the control unit.

Feedforward Approach

In a second functional embodiment of the system according to the disclosure, it is possible that an electrically controllable pressure control valve is provided for the pressure operation of the actuator, the control unit directly generating an electrical operation signal, which represents the target value of the control variable, for pilot control of the pressure control valve.

In the case of this approach, there is no inner control loop, with the expected operation behavior of the pressure control valve rather being jointly taken into consideration predictively by the control unit when outputting the target value. The expected operation behavior of the pressure control valve is for example ascertained in advance on the basis of simulations or empirical tests, and is stored in the form of a corresponding parameter set in a memory unit that communicates with the control unit.

The pressure control valve can be configured as a 3/2 directional solenoid valve for operating a single-acting positioning cylinder that is comprised by the actuator. The single-acting positioning cylinder is structurally integrated into a fan hub of the axial fan and interacts with a spring-loaded restoring means such that the fan blades, in the unpressurized state of operation, assume an angle of incidence that gives rise to a minimal delivery flow. A rotary leadthrough provided on the fan hub produces a connection to the positioning cylinder via a pressure control line.

As a result of a corresponding operation pressure being built up in the positioning cylinder, the angle of incidence of the fan blades can be deflected in the direction of increasing delivery flow counter to the action of the restoring means. In this way, a targeted adaptation of the cooling power of the axial fan is possible by modulating the position of the 3/2 directional solenoid valve between its two valve positions. Here, in a first valve position, the positioning cylinder is pressurized, and in a second valve position, the positioning cylinder is relieved of pressure.

In some embodiments, the vehicle assembly that is to be cooled by the axial fan is a constituent part of an operating system of the utility vehicle. The vehicle assembly may have a traction drive with an internal combustion engine and/or electric motor, which is connected via a transmission to driven wheels of the utility vehicle and/or which serves for the operation of various working or additional functions of the utility vehicle. The vehicle assembly may additionally also involve peripheral components that are to be cooled, such as a hydraulic system, a turbocharger provided for the operation of the internal combustion engine, or an air-conditioning system that is comprised by a cabin ventilation system. Each of the vehicle assemblies may be assigned a separate liquid cooling circuit in which a respective heat exchanger is situated, through which a cooling air stream generated by the axial fan passes for the purposes of dissipating heat.

If multiple separate liquid cooling circuits are present, a corresponding number of temperature sensors may be provided, the sensor signals of which are linked to one another by the control unit for the purposes of determining the actual value of the temperature variable, in order to determine a combined cooling demand of the various vehicle assemblies through corresponding consideration and weighting of the respectively associated operating temperatures.

The above and other features will become apparent from the following detailed description and accompanying drawings.

BRIEF DESCRIPTION OF THE DRAWINGS

The system according to the disclosure for operating a cooling device of a utility vehicle will be described in more detail below on the basis of the appended drawings. Here, identical reference designations relate to corresponding features, or features which are of comparable function. In the drawings.

DETAILED DESCRIPTION

The embodiments or implementations disclosed in the above drawings and the following detailed description are not intended to be exhaustive or to limit the present disclosure to these embodiments or implementations.

Figure 1:
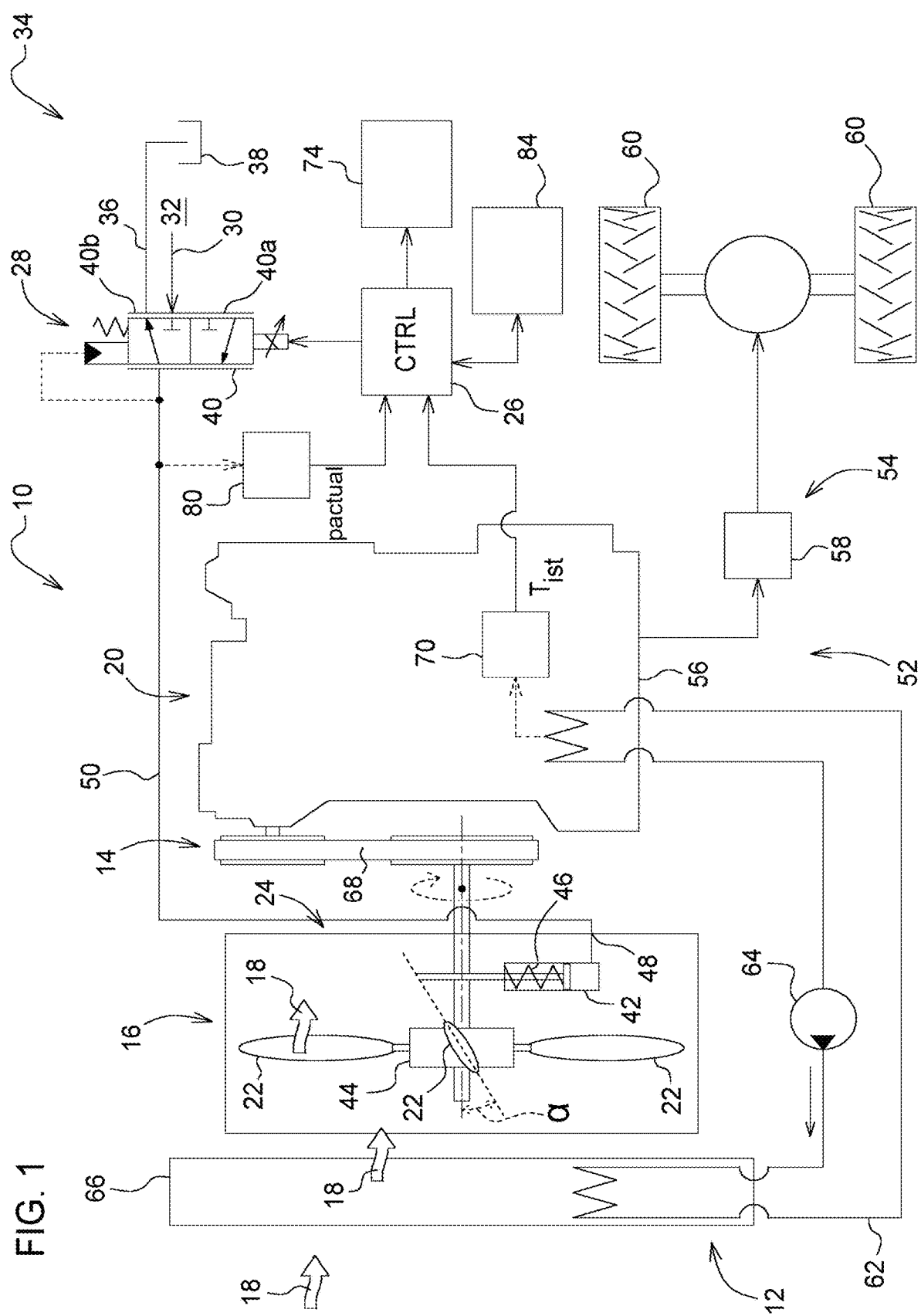
FIG. 1 shows a schematically illustrated exemplary embodiment of the system according to the disclosure for operating a cooling device of a utility vehicle.

FIG. 1 shows a schematically illustrated exemplary embodiment of the system according to the disclosure for operating a cooling device of a utility vehicle.

Accordingly, the system 10 comprises a cooling device 12 with an axial fan 16 which can be set in rotation by a fan drive 14 and which is used to generate a cooling air stream 18 for impingement on a vehicle assembly 20 that is to be cooled. The axial fan 16 has a plurality of fan blades 22 that can be pivoted in terms of an angle of incidence a by deflection of a pressure-operable actuator 24.

A pressure control valve 28 that is electrically controllable by a control unit 26 (e.g., a controller including a processor and memory) serves for the pressure operation of the actuator 24. The pressure control valve 28 is fed with pressurized hydraulic fluid from a hydraulic system 32 of the utility vehicle 34 via an inflow line 30, and a return line 36 opens into a reservoir 38 that is comprised by the hydraulic system 32.

For example, the pressure control valve 28 is configured as a 3/2 directional solenoid valve 40 for operating a single-acting positioning cylinder 42 that is comprised by the actuator 24. The single-acting positioning cylinder 42 is structurally integrated into a fan hub 44 of the axial fan 16 (contrary to the view chosen in FIG. 1 for the sake of clarity) and interacts with a spring-loaded restoring means 46 such that, in the unpressurized state of operation, the fan blades 22 assume an angle of incidence a that gives rise to a minimal delivery flow. A rotary leadthrough 48 provided on the fan hub 44 produces a connection to the positioning cylinder 42 via a pressure control line 50.

The angle of incidence a of the fan blades 22 can be deflected in the direction of an increasing delivery flow, counter to the action of the restoring means 46, by virtue of a corresponding operation pressure, as a control variable, being built up in the positioning cylinder 42. In this way, a targeted adaptation of the cooling power of the axial fan 16 is possible by modulating the position of the 3/2 directional solenoid valve 40 between its two valve positions. Here, in a first valve position 40a, the positioning cylinder 42 is pressurized via the inflow line 30, and in a second valve position 40b, the positioning cylinder 42 is relieved of pressure via the return line 36 in the direction of the reservoir 38.

It is to be noted that pneumatic pressure operation of the actuator 24 is also conceivable instead of the described hydraulic pressure operation.

The vehicle assembly 20 that is to be cooled by the axial fan 16 is a constituent part of an operating system 52 of the utility vehicle 34. The utility vehicle 34 (not illustrated in any more detail) is for example an agricultural or forestry vehicle, or a construction vehicle.

By way of example, the vehicle assembly 20 has a traction drive 54 with an internal combustion engine and/or electric motor 56, which is connected via a transmission 58 to driven wheels 60 of the utility vehicle 34 and/or which serves for the operation of various working or additional functions of the utility vehicle 34. The vehicle assembly 20 is assigned a water- or oil-conducting liquid cooling circuit 62 in which a coolant pump 64 and a heat exchanger 66 are situated, through which heat exchanger a cooling air stream 18 generated by the axial fan 16 passes for the purposes of dissipating heat. For this purpose, the axial fan 16 is set in rotation either by the internal combustion engine and/or electric motor 56 via the fan drive 14 configured as a belt drive 68, or by a dedicated electric drive.

The system 10 furthermore comprises a temperature sensor 70 for determining an actual value Tactual, which represents a present operating temperature of the vehicle assembly 20, of a temperature variable. The actual value Tactual is determined by the control unit 26 on the basis of the sensor signals provided by the temperature sensor 70.

For the sake of clarity, FIG. 1 shows a single vehicle assembly 20, but in addition to this there may also be peripheral components for cooling, such as the hydraulic system 32, a turbocharger provided for the operation of the internal combustion engine 56, or an air-conditioning system that is comprised by a cabin ventilation system. Each of the vehicle assemblies 20 is assigned a separate liquid cooling circuit 62 in which a respective heat exchanger 66 is situated, through which a cooling air stream 18 generated by the axial fan 16 passes for the purposes of dissipating heat.

If multiple separate liquid cooling circuits 62 are present, a corresponding number of temperature sensors 70 is provided, the sensor signals of which are linked to one another by the control unit 26 for the purposes of determining the actual value Tactual of the temperature variable, in order to determine a combined cooling demand of the various vehicle assemblies 20 through corresponding consideration and weighting of the respectively associated operating temperatures.

Further structural details will emerge in conjunction with the two functional embodiments, discussed below, of the system depicted in FIG. 1.

Feedback Approach

Figure 2:
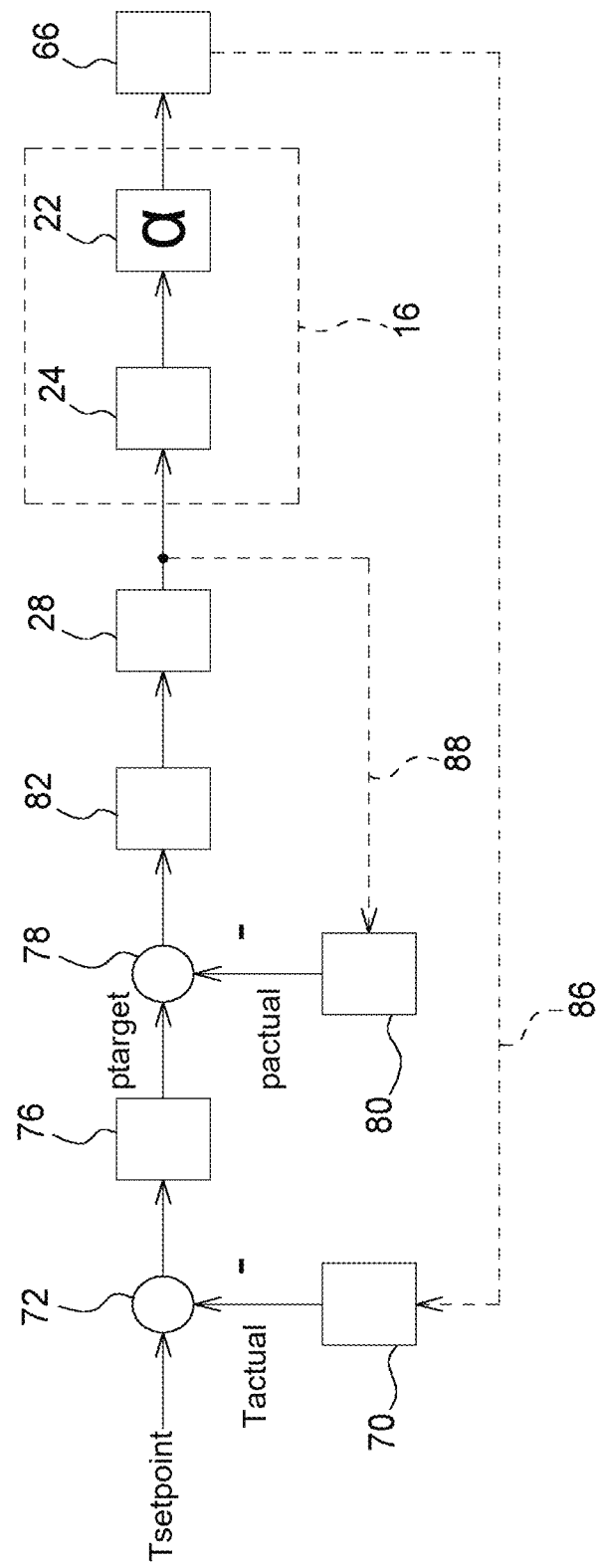
FIG. 2 shows a first functional embodiment, illustrated as a flow diagram, of the system according to the disclosure depicted in FIG. 1.

In a first functional embodiment of the system 10, as shown in FIG. 2, the control unit 26 firstly, in a first function block 72, compares the actual value Tactual, determined by the temperature sensor 70, of the temperature variable with a specified setpoint value Tsetpoint. Here, the setpoint value Tsetpoint is specified on the basis of a present cooling demand of the vehicle assembly 20. The present cooling demand of the vehicle assembly 20 is in the present case determined by an engine control unit 74 (see FIG. 1) and transmitted to the control unit 26 for the purposes of correspondingly setting the setpoint value Tsetpoint of the temperature variable.

In accordance with a control deviation, ascertained in the first function block 72, between the actual value Tactual and the setpoint value Tsetpoint of the temperature variable, the control unit 26 subsequently, in a second function block 76, determines a target value ptarget for the operation pressure that is to be input at the actuator 24.

Based on this, in a third function block 78, the target value ptarget output in the second function block 76 is compared with an actual value pactual of the operation pressure detected in the pressure control line 50 of the actuator 24 by a pressure sensor 80, and in a fourth function block 82, in accordance with a control deviation between the actual value pactual and the target value ptarget of the operation pressure, the control deviation being ascertained in the third function block 78, the control unit 26 generates an electrical operation signal for activating the pressure control valve 28. A control curve provided for the generation of the electrical operation signal is stored in a memory unit 84 that is connected to the control unit 26 (see FIG. 1).

In the case of this approach, the system 10 therefore comprises an arrangement of cascaded control loops. Aside from an outer control loop 86, in which a minimization of the control deviation ascertained for the temperature variable is performed, an inner control loop 88 is also provided, which serves for the actual adjustment of the operation pressure by closed-loop control by the pressure control valve 28. The pressure control valve 28 is thus a constituent part of the inner control loop 88, and possible tolerances with regard to the operation behavior of the pressure control valve are jointly corrected in the context of the inner control loop.

Feedforward Approach

Figure 3:
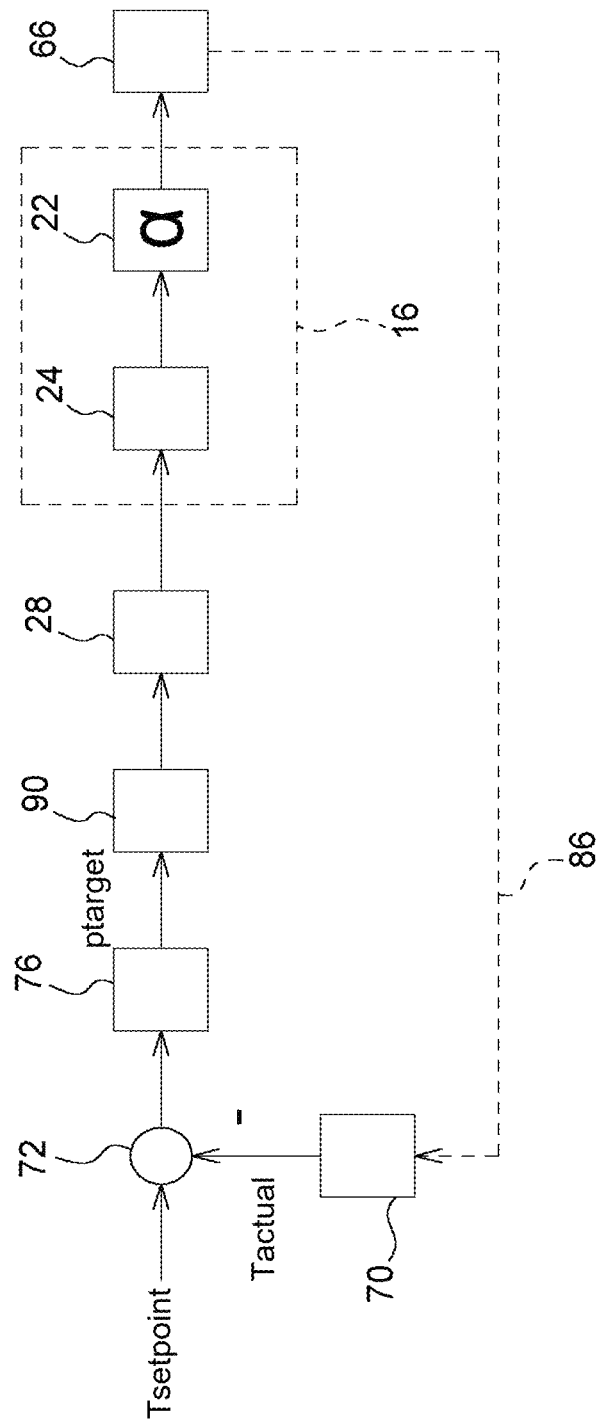
FIG. 3 shows a second functional embodiment, illustrated as a flow diagram, of the system according to the disclosure depicted in FIG. 1.

A second functional embodiment of the system 10 is depicted in FIG. 3. Here, in a third function block 90, the control unit 26 directly generates an electrical operation signal, which represents the target value ptarget of the operation pressure, for pilot control of the pressure control valve 28. In the case of this approach, the first and the second function block 72, 76 are present without modification, but the inner control loop 88, and thus the pressure sensor 80 required for same, are omitted. Rather, the expected operation behavior of the pressure control valve 28 is jointly taken into consideration predictively by the control unit 26 in the third function block 90 when outputting the target value ptarget. The expected operation behavior of the pressure control valve 28 is ascertained in advance on the basis of simulations or empirical tests, and is stored in the form of a corresponding parameter set in the memory unit 84 that communicates with the control unit 26.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A system for operating a cooling device of a utility vehicle, comprising:
    an axial fan which can be set in rotation by a fan drive and which is used to generate a cooling air stream for impingement on a vehicle assembly that is to be cooled, the axial fan having a plurality of fan blades that can be pivoted in terms of an angle of incidence by deflection of an actuator;
    a temperature sensor for determining an actual value of a temperature variable that reflects a present operating temperature of the vehicle assembly;
    a control unit that compares the actual value of the temperature variable with a specified setpoint value to output a target value of a control variable provided for the operation of the actuator, wherein the control variable is one of a hydraulic and a pneumatic operation pressure for deflecting the actuator; and
    a pressure control valve configured to control the pressure operation of the actuator, wherein the control unit is configured to compare the output target value of the control variable with a sensor-detected actual value to generate an electrical operation signal for activating the pressure control valve.

2. The system of claim 1, wherein the pressure control valve is configured as a 3/2 directional solenoid valve for operating the actuator comprising a single-acting positioning cylinder.

3. The system of claim 1, wherein the vehicle assembly that is to be cooled by the axial fan is a constituent part of an operating system of the utility vehicle.

4. The system of claim 1, wherein the pressure control valve is an electrically controllable pressure control valve.

* * * * *